Aug. 23, 1949.  J. BAILEY ET AL  2,479,804

METHOD AND MEANS FOR EXTRUDING PLASTIC MATERIAL

Filed May 17, 1947

INVENTOR.
JAMES BAILEY
BY ROBERT W. CANFIELD
Parham + Bates
ATTORNEYS

Patented Aug. 23, 1949

2,479,804

UNITED STATES PATENT OFFICE 2,479,804

METHOD AND MEANS FOR EXTRUDING PLASTIC MATERIAL

James Bailey and Robert W. Canfield, West Hartford, Conn., assignors to Plax Corporation, Hartford, Conn., a corporation of Delaware Application May 17, 1947, Serial No. 748,792

6 Claims. (Cl. 18—12)

The invention relates to the production of thermoplastic sheet or ribbon by extrusion and, more particularly, to improved and novel extrusion procedure and shaping die or nozzle structure for forming the sheet or ribbon.

Heretofore, apparatus has been employed to form a web or sheet by extrusion through a straight slot nozzle. Such apparatus is illustrated and described in Patent No. 2,297,645, granted on September 29, 1942, to James Bailey, one of the co-inventors here. Under certain conditions of pressure, temperature and flow of plastic through the nozzle there disclosed, difficulty has been encountered in producing homogeneous sheet and in maintaining uniform thickness.

This difficulty may be overcome by introducing the flow of plastic material into the slit nozzle along a line generally at right angles and transversely disposed relative to the sheet extruded from the nozzle, and, thereafter, by uniformly regulating the pressure of the plastic transversely of the slit nozzle prior to the extrusion of the sheet.

An object of the present invention is to provide an improved slit nozzle for shaping thermoplastic material.

A more specific object is to provide a nozzle of the type indicated, having a side entrance inlet chamber through which the plastic material may be forced in an uninterrupted, generally linear stream, and from which continuous stream, the plastic is laterally forced through a slit orifice, the entire width of which communicates directly with the inlet chamber.

A further object is to provide a nozzle having adjustable pressure regulating means for equalizing the pressure of the plastic transversely of the slit orifice and, in addition, adjustable slit means for forming the plastic into sheet of uniform thickness.

One advantage of nozzles embodying the invention is the adaptability of the nozzle to a wide range of plastic pressure, temperature and viscosity conditions without interchange of nozzle parts.

Other objects and advantages of the present invention will be more readily understood from the following description of the embodiment of the invention illustrated in the drawings, in which.

Figure 1:
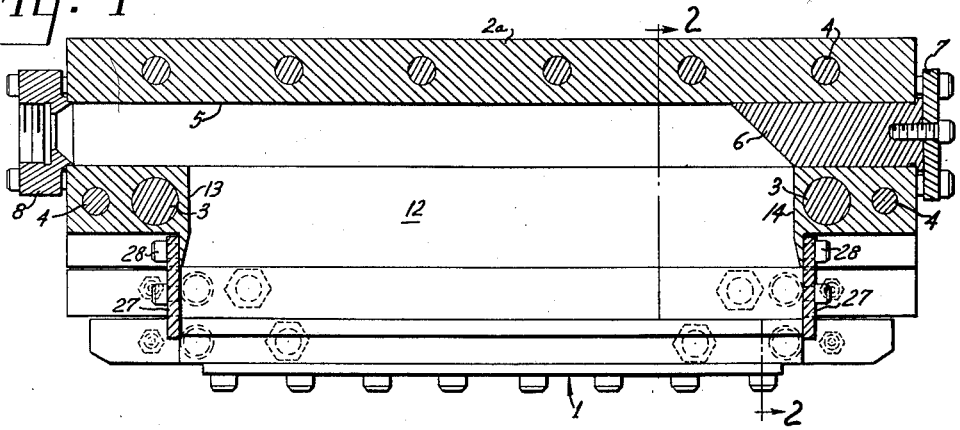
Fig. 1 is a view in horizontal section taken on line 1—1 of Fig. 2 of a forming nozzle embodying the invention.

Referring to the drawings, there is shown a shaping nozzle, designated generally by the numeral 1, which includes a main housing 2 formed by upper and lower elongated, metal housing blocks 2a and 2b, respectively, secured together adjacent their ends by main bolts 3 and by smaller bolts 4. Extending centrally through the length of the housing 2 is a cylindrical inlet or plastic receiving chamber 5 formed by cylindrical walls 5a and 5b, respectively, located in the upper and lower blocks 2a and 2b.

The downstream end of the inlet chamber 5 is closed by a plug 6 secured therein as by means of a cap plate 7 bolted to the housing 2. Plastic is supplied to the inlet chamber 5 through a coupling member 8 which is bolted to the housing 2 and secured, as by threads, to the outlet or discharge end 7 of an extruder. Extending forwardly from the inlet 5 through the die 2, is a slot or passageway 10, the bottom and top walls of which are formed respectively by the upper surface 11 of block 2b and by the top wall 12 of a channel cut from the contiguous surface of the upper block 2a.

In addition to the bottom wall 11 and the top wall 12, which, in the embodiment illustrated, are parallel and narrowly spaced relative to each other, the passageway 10 has widely spaced side walls 13 and 14 located in the housing block 2a adjacent its ends. The passageway 10 throughout its width is in open communication with the inlet chamber 5 so that plastic material supplied by the extruder outlet 9 to the passageway 10 is diverted by the plug 6 into the passageway in a sheet stream which moves generally transversely and at right angles to the flow of plastic into the inlet chamber 5.

In accordance with the present invention, the walls 11 and 12 must define a space, which, when filled with plastic, forms a plastic sheet generally parallel to the flow of plastic into the inlet chamber 5. In the preferred embodiment shown in the drawings, the sheet formed by the walls 11 and 12, if extended rearwardly into the cylindrical inlet chamber 5, will contain the center line of the chamber.

The slot or passageway 10 in the main housing 2 registers with a generally coextensive passageway of like width formed by first, or upstream, and second, or downstream, pairs of upper and lower adjustable doctor blades 15, 16 and forming blades 17, 18 which are mounted for limited vertical movement and angular adjustment relative to one another so that the positions of the flat contiguous forming surfaces 15a and 16a of the upstream pair of blades, and the comparable surfaces 17a and 18a of the downstream pair may be adjusted to vary the size and form of the nozzle openings formed therebetween. The surfaces 15a, 16a, 17a and 18a are highly polished to form a smooth finish on sheet extruded therebetween and are readily removed for replacement or for repolishing as may be required from time to time in the operation of the nozzle.

The lower blades 16 and 18 are secured respectively in inboard and outboard relationship to the lower block 2b by a series of bolts 19. Similarly, the upper blades 15 and 17 are secured, respectively, in inboard and outboard relationship to the upper block 2a by bolts 20.

Figure 2:
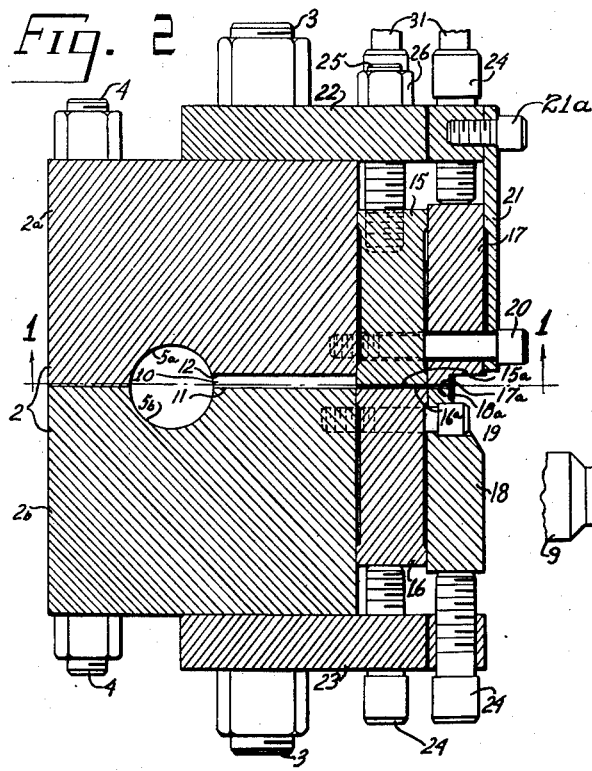
Fig. 2 is a view in vertical section taken on line 2—2 of Fig. 1.
Figure 3:
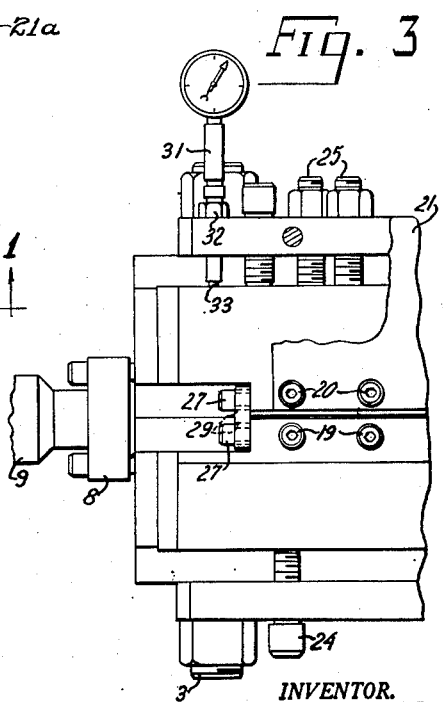
Fig. 3 is a front elevation of a portion of the forming nozzle having its inlet connected to the outlet of an extruder.

In order to reduce the tendency of the blades to spring outwardly under pressure exerted by plastic material within the forming device or nozzle, the bolts are disposed in aligned holes located in the blades adjacent the forming surfaces 15a, 16a, 17a and 18a, and are secured in tapped holes in the blocks 2a and 2b. As shown in Fig. 2, the forming surfaces 16a and 18a are substantially aligned with the lower surface 14 of the passageway 10 so that plastic passing therethrough has little, if any, opportunity to exert a force on the lower blades which would tend to spring them outward. However, the upper blades 15 and 17 present surfaces normal with respect to the passageway 10 and to plastic passing therethrough, and, for that reason, a reinforcing plate 21 overlies the outer or front surface of the blade 17 and is secured with the upper blades by the bolts 20 to the block 2a.

The upper end of the reinforcing plate 21 is secured as by bolts 21a to a supporting plate 22 which, in turn, is secured as by means of bolts 3 to the upper block 2a. A second or lower horizontally disposed supporting plate 23 is similarly secured to the lower surface of the lower block 2b. The upper and lower plates 22 and 23 extend substantially the entire length of the housing blocks and extend forwardly therefrom so as to respectively overlie and underlie the upper blades 15 and 17 and the lower blades 16 and 18.

The extrusion slots formed between the surfaces 15a, 16a and 17a, 18a may be varied in height, and in the relationship of the slots to one another, by adjusting the vertical positions of the blades by means of stop bolts 24 and tension bolts 25.

Tapped holes are provided in the supporting members 22 and 23 which contain the stop bolts or studs 24, the inner ends of which bear against the upper surfaces of the upper blades 15 and 17 and lower surfaces of the lower blades 16 and 18. Two such stop bolts 24 bear on each blade adjacent its ends, the vertical position of the stop bolts 24 being adjustable to limit the vertical movement and the extreme position of the ends of the blades from the closed position.

As illustrated in the drawings, the tension bolts 25, which are located adjacent each of the stop bolts 24, extend through smooth holes in the supporting plates 22 and 23 and are secured in tapped holes in the nozzle blades. Tension is exerted on the bolts 25 by means of nuts 26 which bear on the plates 22 and 23.

As best seen in Fig. 2, the stop bolts 24 bearing on, and the tension bolts 25 secured to, the lower blades 16 and 18 primarily serve with the bolts 19 to reinforce and secure the lower blades in their permanent positions, wherein the lower forming surfaces 16a and 18a are disposed in alignment with the lower surface 14 of the passageway 10. Adjustments in the heights of the slots between each pair of blades is obtained by adjusting the vertical positions of the ends of the upper blades 15 and 17 within a limited range so that the space between the cooperating pairs of blade surfaces 15a, 16a and 17a, 18a and consequently the thickness of the plastic sheet extruded therebetween may be varied. A sloppy fit between the bolts 20 and the upper blades 15 and 17 permits the vertical adjustment which is obtained in cooperation with the bolts 24 by means of tension bolts 25.

To prevent leakage of plastic at the ends of the adjustable slots, end plates 27 are provided which cover the end joints between the two pairs of blades and between the inboard blades and the housing. Each plate 27 is secured by studs 28 to the housing blocks 2a and 2b and to the inboard blades 15 and 16, suitable slotted holes 29 being provided in the plates 27 to permit vertical adjustment of the blades 15 and 16.

During and following adjustments, the positions of the ends of each of the upper blades 15 and 17 relative to the fixed underlying ends of the lower blades are automatically indicated by four feeler gauges 31, one of which is located adjacent each pair of the upper cooperating stop and tension bolts 24, 25. The housing of each gauge is secured as by a threaded shank and lock nut 32 to the supporting plate 22 so that the gauge feeler or finger 33 freely bears on an underlying blade.

The operation of the illustrated nozzle will be generally understood from the foregoing description. A thermoplastic material, such as a cellulose acetate, polystyrene, or the like, is supplied under proper temperature, pressure and viscosity conditions by the extruder 9 in conventional manner to the side entrance inlet chamber 5 and is diverted by the plug 6 through the main housing passageway 10. The plastic material is discharged between the shaping blades as a plastic sheet, the thickness of which is determined by the location of the surfaces 15a, 16a, 17a and 18a of the blades.

The side entrance delivery of the plastic material to the nozzle and the subsequent diversion of the plastic laterally from the elongated chamber 5 into a stream of restricted thickness flowing at right angles to the entrance flow, acts to deliver the plastic to the forming or shaping blades 17, 18 under substantially uniform pressure throughout the entire width of the passageway 10. Any tendency for the nozzle to establish a differential in pressure transversely of the stream flowing through the passageway 10 as the result of friction losses from the upstream to the downstream side of the nozzle, is uniformly distributed from one side of the nozzle to the other so that, by adjusting the space between the ends of the inboard doctor blades 15 and 16, the plastic can be delivered to the outboard or downstream shaping blades 17 and 18 under substantially uniform pressure. Proper fine adjustment of the relative position of downstream pair of shaping blades 17, 18 will cause the plastic to extrude in a sheet of uniform thickness throughout its entire width.

While not shown in the drawing, it will be understood that means may be provided in conjunction with the nozzle for controlling the temperature of the plastic in the nozzle. Such control is customarily obtained by circulating a heating or cooling medium through suitable passageways in the blocks 2a and 2b.

Having thus described our invention, we claim:

1. Apparatus for shaping a stream of plastic molding compound under pressure into a continuous sheet, comprising an elongated chamber open at one end to receive plastic material under pressure, a restricting passageway of substantial width and of a height less than, and extending laterally from, the inlet chamber, a pair of pressure regulating blades spaced to define a restricting orifice registering with said passageway, a pair of forming blades spaced to define a discharge orifice registering with said pressure regulating orifice, and means associated with each of said blades for angularly and rectilinearly adjusting the position of each blade independently of the other blades.

2. Apparatus for shaping a stream of plastic molding compound under pressure into a continuous sheet, comprising an elongated chamber open at one end to receive plastic material under pressure, a restricting passageway of substantial width and of a height less than, and extending laterally from, the inlet chamber, a pair of pressure regulating blades spaced to define a restricting orifice registering with said passageway, a pair of forming blades spaced to define a discharge orifice registering with said pressure regulating orifice, spaced pairs of tension and stop members associated with each of said blades for angularly and rectilinearly adjusting the position of each blade relative to all of the other blades, and means indicating angular and rectilinear change in position of a blade.

3. Apparatus for shaping a stream of plastic molding compound under pressure into a continuous sheet, comprising an elongated cylindrical chamber open at one end to receive plastic material under pressure, a restricting passageway of substantial width and of a height less than, and extending laterally from, the inlet chamber, said passageway being aligned with the center line of said cylindrical chamber, a pair of blades spaced to define a restricting orifice registering with said passageway, means associated with each of said blades for angularly and rectilinearly adjusting the position of each blade and a second pair of blades adjustable independently of said orifice blades for differentially regulating the pressure of the plastic transversely of said passageway.

4. The process of shaping plastic material by extrusion molding comprising feeding an initial stream of the plastic material under pressure in a first direction, altering the direction of flow of material to a restricted second stream of lesser thickness than the initial stream and subjecting the second stream to independently regulable thickness controlling pressure at a plurality of spaced points along said second stream.

5. The process of shaping plastic material into a continuous sheet by extrusion molding comprising feeding an initial stream of the plastic material under pressure in a first direction, altering the direction of flow of material to a restricted second stream of lesser thickness than, and flowing laterally from, a length of the initial stream in a second direction at right angles to said first direction, said length of initial stream being the initial width of said second stream, equalizing the pressure of the second stream transversely of its width, and discharging the material in said second direction through adjustably spaced blades as plastic sheet of uniform thickness said pressure equalizing being effected independently of the adjustment of said blades.

6. Apparatus for shaping thermo-plastic material which comprises a side entrance inlet chamber for receiving plastic material under pressure, a restricting passageway angularly disposed to the inlet chamber and communicating with a lateral opening in the inlet chamber, an adjustable orifice registering with said passageway, and adjustable controls for differentially regulating pressure of the plastic material transversely in said passageway and independently of the adjustment of said orifice.

JAMES BAILEY.
ROBERT W. CANFIELD.

REFERENCES CITED

The following references are of record in the file of this patent:

UNITED STATES PATENTS

| Number | Name | Date |
| --- | --- | --- |
| 410,822 | Day | Sept. 10, 1889 |
| 1,976,539 | Bonniksen | Oct. 9, 1934 |
| 2,031,387 | Schwarz | Feb. 18, 1936 |
| 2,090,404 | Parkhurst | Aug. 17, 1937 |
| 2,121,966 | Jacobson | June 28, 1938 |
| 2,168,288 | Fischer | Aug. 1, 1939 |
| 2,318,469 | Derby et al. | May 4, 1943 |
| 2,364,435 | Foster et al. | Dec. 5, 1944 |
| 2,365,375 | Bailey et al. | Dec. 19, 1944 |
| 2,369,583 | Lucid | Feb. 13, 1945 |
| 2,371,709 | Rineer | Mar. 20, 1945 |
| 2,387,718 | Coleman et al. | Oct. 30, 1945 |
| 2,393,452 | Bailey et al. | Jan. 22, 1946 |